Dec. 9, 1952   B. S. BENSON ET AL   2,620,981
CONVERTING DEVICE

Filed Aug. 30, 1950   2 SHEETS—SHEET 1

INVENTORS
BERNARD S. BENSON AND
RALPH E. BROWN
BY
George J. Smyth
ATTORNEY.

Dec. 9, 1952   B. S. BENSON ET AL   2,620,981
CONVERTING DEVICE
Filed Aug. 30, 1950   2 SHEETS—SHEET 2
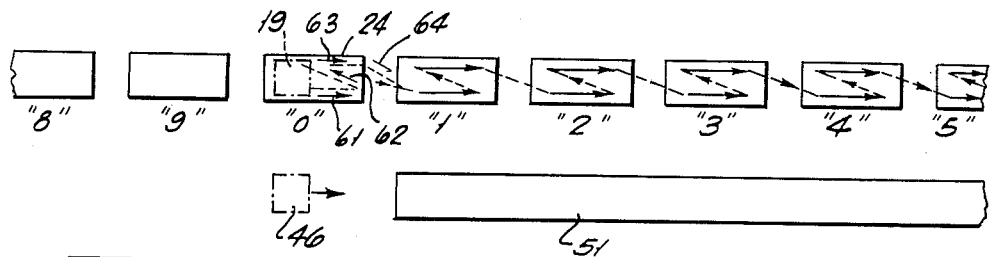
Fig. 2
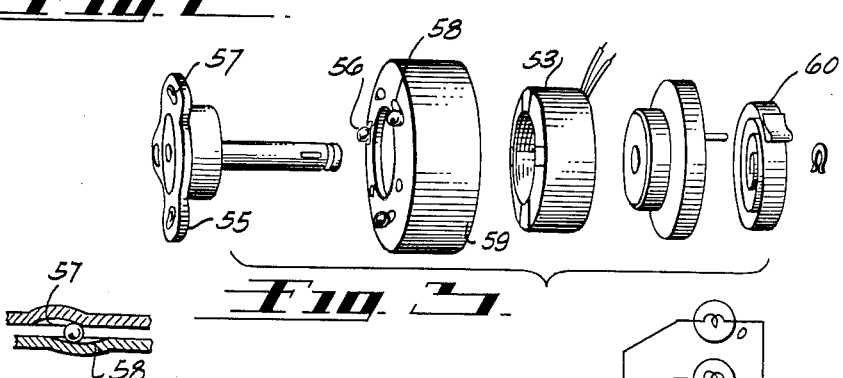
Fig. 3
Fig. 4
Fig. 5
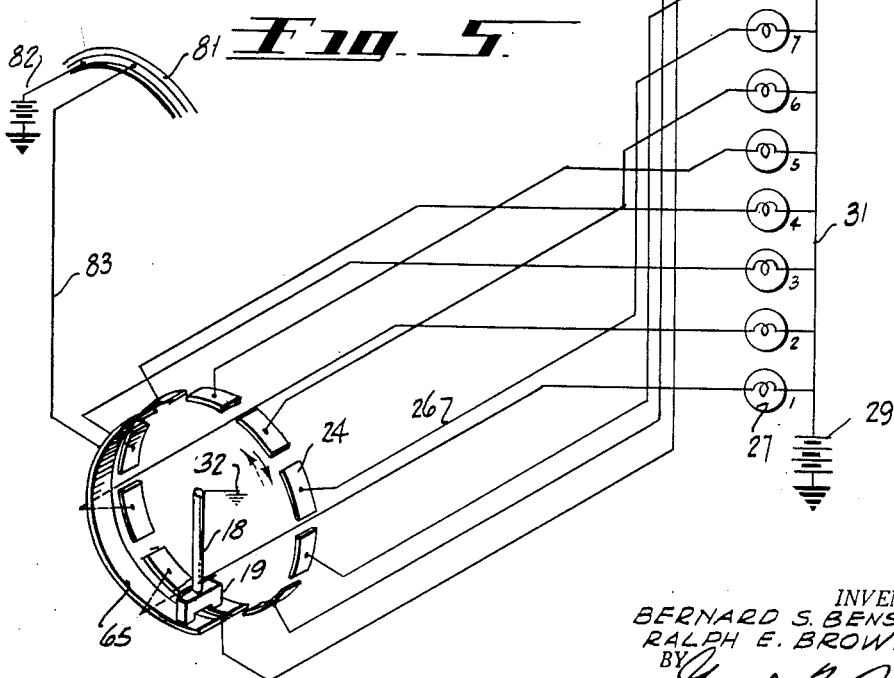
INVENTORS
BERNARD S. BENSON AND
RALPH E. BROWN
BY
George W. Smyth
ATTORNEY Patented Dec. 9, 1952

2,620,981

UNITED STATES PATENT OFFICE 2,620,981

CONVERTING DEVICE

Bernard S. Benson, Malibu, and Ralph E. Brown, Los Angeles, Calif., assignors to Douglas Aircraft Company, Inc., Santa Monica, Calif.

Application August 30, 1950, Serial No. 182,364

15 Claims. (Cl. 235—103)

This invention relates to converting devices and more particularly to such a device for converting continuously varying values into discrete digital form.

The device of the present invention, in the broadest aspects thereof, comprises means for translating variable values indicative of the position of a movable part into discontinuous discrete form. The device is particularly useful where it is desired to employ analog measuring systems, that is, systems which do not supply exact values but merely analogs of a continuously variable quantity or the like, with devices which require an input of a discrete rather than continuous nature. The device is not limited to such use for the same, for example, could be used as an indicator for registering in discrete, digital form varying analog values, that is, values which were merely analogs of a variable. For instance, the device could be used for registering, or form a part of a recording system for determining, in digital or discrete form, the number of revolutions of a rotatable shaft driving an element, the movement of which was used to carry out a mensuration.

The continuously variable values are, in the illustrated embodiment of the invention, translated into rotational movement for producing relative movement between a contact element and a plurality of spaced contact segments, each of which forms a part of a normally open electric circuit. Where a decimal system was desired, the segments would be decadal, that is, ten in number although it will be obvious that the segments could be other than ten in number.

These normally open circuits will be seriately energized as the contact element relatively moves into engagement with the segments in accordance with the rotational movement indicative of the variable value. Each circuit may include an electro-responsive element capable of furnishing the signal or indication desired, depending upon the field of use of the device.

Where it is desired or necessary to produce a signal or indication or more than one decade, for example, a succession of groups of segments and relatively movable contact elements may be used. By suitable interconnecting driving means it is possible to produce relative movement between each contact element and the segments of the group or series engaged thereby so that movement between each contact element and the segments over which it relatively moves can be taken from the moving part. The interconnecting means preferably should be such that the rate of movement of each succeeding contact element relative to the segments engaged thereby is a preselected fractional rate of the movement of the preceding contact element relative to the segments associated therewith. With the segments engaged by each element equal in number to the denominator of the fractional rate, each contact element will be moved seriately across the segments engaged thereby as the preceding contact element is successively moved relative to the segments engaged thereby a predetermined number of times equal to the denominator of said fractional rate.

To eliminate the possibility of a contact element coming to rest intermediate an adjacent pair of segments to thus produce an impositive signal, means are provided for rapidly moving each contact element relative to the segment engaged thereby as the contact element moves toward disengagement with the engaged segment to bring about substantially instantaneous movement of the contact element into engagement with the next adjacent segment. Thus, even though movement producing relative movement between a contact element and the spaced segments over which the contact element relatively moves may cease, the device of the present invention is incapable of producing an impositive signal for the contact element is prevented from coming to rest intermediate an adjacent pair of segments. Furthermore, there is substantially no time lag in the transit of a contact element from one segment to the next adjacent segment.

To obviate any impositive or incorrect signal or indication at the time any next succeeding contact element in the succession is made operative by the transition of a preceding contact element relative to the segments engaged thereby, means are provided for substantially instantaneously moving the succeeding contact element relative to the segments engaged thereby as the preceding contact element completes its measuring cycle and moves into engagement with the terminal segment of the series of segments engaged by this contact element. As movement of the preceding contact element into a predetermined spatial position substantially instantaneously initiates movement of the next succeeding contact element, there is no likelihood of ambiguity or error in the indications effected by movement of each contact element relative to the segments seriately engaged thereby.

Other features and advantages of the present invention will be hereinafter apparent from the following description, particularly when taken in connection with the accompanying drawing, in which Figure 1 is a perspective view of the device of the present invention;

Figure 2 is a schematic view showing a portion of the contact segments of one group together with the means used to initiate the substantially instantaneous movement of the contact element of the next adjacent group of segments;

Figure 3 is an exploded view of the element of the device used to produce the substantially instantaneous movement of the contact elements;

Figure 4 is a sectional view of a portion of the device shown in Figure 3; and

Figure 5 is a diagrammatic view of the circuit arrangement of one group of segments.

Figure 1:
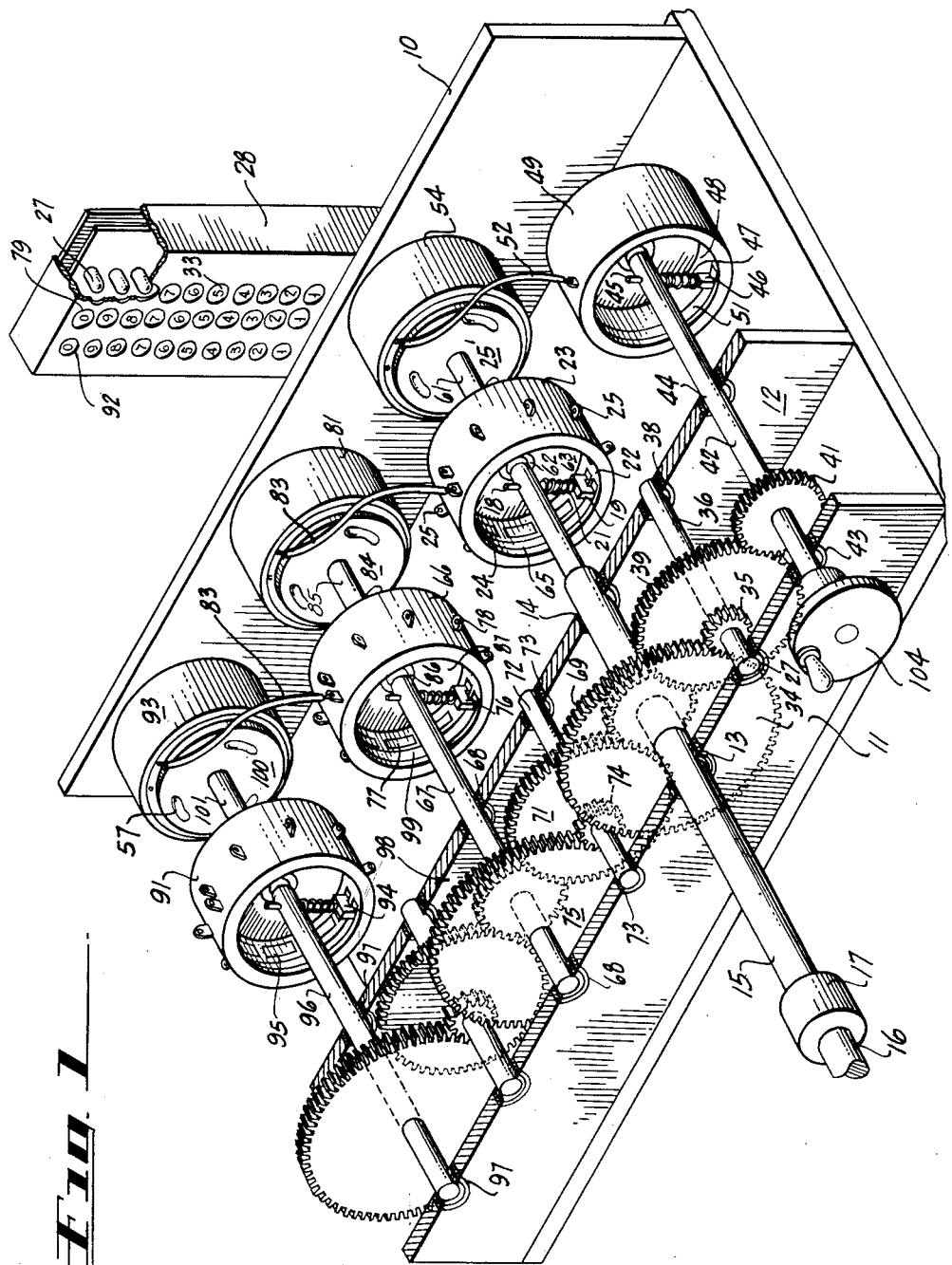

The device of the present invention, referring now to the drawings and more particularly to Figure 1, comprises a suitable casing 10 including wall elements 11 and 12 carrying aligned bearing members 13 and 14 respectively for rotatively supporting a shaft 15 which, by some suitable means, is drivingly connected to a movable element, such as, for example, a rotatably driven shaft, the rotations of which are to be recorded or indicated. It should be made clear here that the device of the present invention is not limited to measuring or recording the revolutions of a rotatably driven member for by conventional rack and pinion means, straight line motion of a moving member can be easily translated into rotational movement, which movement in turn can be used to rotatively drive the shaft 15.

To simplify the disclosure of the device of the present invention, however, the device will be described herein as one for translating the continuously varying values represented by a rotating shaft, indicated at 16, and coupled to the outer end of the shaft 15 by some suitable coupling device, indicated at 17, into discrete, discontinuous form.

It will be seen that the shaft 15, adjacent the inner end thereof, carries a slidably mounted, radially extending arm 18 carrying at its one end a contact element 19. A coil spring 21, sleeving the arm 18 and seating against the shaft 15, normally urges the arm 18 and consequently contact element 19 radially outwardly of the shaft to hold the element in good electrical engagement with the inner cylindrical wall surface 22 of a commutator 23. The inner wall surface of the commutator 23 is, by means to be later described, held concentric with the longitudinal axis of the shaft 15.

Embedded within the insulating material forming the cylindrical wall of the commutator 23 are a plurality of contact segments 24, ten in number and spaced apart an equal distance circumferentially of the wall surface 22. The one face of each segment is substantially flush with the inner wall surface 22 so that as the contact element 19 rotates with the shaft 15, the former seriately engages the ten spaced segments 24 for each complete revolution of the shaft 15.

Each segment 24 includes a terminal element 25 which radially projects outwardly from the outer wall surface of the commutator 23. Although not shown in Figure 1 but illustrated in the circuit diagram of Figure 4, a conductor 26 is led from each terminal element 25 to an electro-responsive element 27, here shown as a small incandescent lamp or the like. The lamps 27, electrically connected to the segments 24, are linearly arranged on a panel 28, as best shown in Figure 1. Each lamp 27 is connected to a source of current, indicated at 29, through a common lead or conductor 31.

As the arm 18 is grounded, as indicated at 32, engagement of the contact element 19 with each segment 24 completes the circuit of the lamp 27 electrically connected to the engaged segment. It should be understood now that the energization of the lamps 27, as the contact element 19 seriately engages the segments 24, will indicate the position of the element 19 relative to the circumferentially arranged segments 24. As the contact element 19 is moved in accordance with the continuously varying value represented by the rotating shaft 16, the energization of the lamps 27 will consequently indicate the quantum of this varying value.

To simplify the signal or indication made by an energized lamp and to present the signal in digital form, the panel 28 may carry small translucent discs 33 closing openings coinciding with the linearly arranged lamps 27. These linearly arranged discs 33 will carry indicia in the form of the digits, as clearly shown in Figure 1. The segments 24 are so connected by the leads 26 to the lamps 27 that energization of any lamp will indicate, in tenths, a partial revolution of the shaft 16. This is done merely by serially connecting the segments to the lamps arranged adjacent the disc bearing digits. Thus, if the shaft is rotated nine-tenths of a revolution, the contact element 19 will be engaged with the "9th" segment electrically connected to the lamp 27 arranged adjacent the disc 33 bearing the digit "9."

To eliminate an impositive signal, such as would occur if the contact element 19 should come to rest intermediate any adjacent pair of segments 24, means are herein provided for substantially instantaneously moving the contact element 19 from an engaged segment to the next adjacent segment as the contact moves toward disengagement with the engaged segment. This means, in the now preferred form of the invention, comprises a gear 34 coaxially mounted to the shaft 15 and engaging and driving a pinion 35 carried by a shaft 36, the opposite ends of which are journaled in bearings 37 and 38 carried respectively by the wall elements 11 and 12 of the casing 10. Fixed to the shaft 36 is a gear 39 which, in turn, engages and drives a gear 41 coaxially carried by a shaft 42 supported in bearings 43 and 44 carried respectively by the wall elements 11 and 12. The gear train just described is such that for each complete revolution of the shaft 15, the shaft 42 will be driven ten revolutions.

The shaft 42 slidably carries at its inner end a radially extending arm 45 to which is mounted a contact element 46. The contact element 46 is normally urged radially outwardly of the shaft 42 by a coil spring 47 sleeving the arm 45 and seating at its end against the shaft 42. The spring 47 thus acts to hold the contact element 46 in engagement with the inner cylindrical wall surface 48 of a commutator 49 fixed by any suitable means in a position in which the inner cylindrical wall surface 48 is concentric with the longitudinal axis of the shaft 42. The commutator 49 carries an embedded elongate segment 51, the one face of which is substantially flush with the inner wall surface 48 so that the contact element 46 engages the exposed face thereof as the shaft 42 is rotatably driven from the shaft 15.

The elongate segment 51 extends substantially 180 degrees about the cylindrical wall surface 48 and is electrically connected by a lead 52 to the coil 53 of a solenoid 54 suitably supported on the rear wall element of the casing 10. This solenoid, as best shown in Figure 3, comprises a disc-shaped armature plate 55 which, when the coil 53 is energized, is rocked or partially rotated relative to the coil as the plate is attracted or moved toward the coil. This rotational movement of the armature plate 55 is brought about, as the plate is drawn toward the coil 53, by camming action of ball bearings 56 seated in the ball races formed by inclined grooves 57 and 58 formed respectively in the adjacent faces of the armature plate 55 and the transverse wall of the coil housing 59, as illustrated in Figure 4. A spring 60 so interconnects the armature plate 55 and the housing 59 that the plate is returned to its normal position upon deenergization of the coil 53.

The armature plate 55 carries a concentrically mounted shaft 61, the outer free end of which is concentrically fixed by a bushing 62 to the circular end wall 63 of the commutator 23 which closes the one end thereof. Thus, as the coil 53 of the solenoid 54 is energized to rock or partially rotate the armature plate 55 about its center, the commutator 23 will be also rocked or partially rotated about the axis of the wall surface 22. The shaft 61 thus supports the commutator 23 for movement about an axis coincident with the axis of the shaft 15.

It should be seen that as the shaft 42 is rotated at ten times the speed of rotation of the shaft 15, the contact element 46 will move into and out of engagement with the segment 51 ten times for each complete revolution of the shaft 15. Thus the solenoid 54 will be intermittently energized to rock the commutator 23 ten times for each complete revolution of the shaft 15, and the spring 60 will, each time the solenoid is deenergized, return the commutator 23 to its normal position.

It can be pointed out that the solenoid could be used to rock the arm 18 carrying the contact element 19, in which case the arm would be fixed to the shaft 61 and the commutator 23 would be fixed to and rotatable with the shaft 15. Furthermore, in some fields of use, the segments 24 could be linearly arranged and the contact element 19 mounted for movement in a straight line path of motion coincident with the linearly arranged segments.

In the operation of the device of the form illustrated, as the shaft 15 is rotated in a clockwise direction one revolution to seriately sweep the contact element 19 in a clockwise direction over the ten circumferentially arranged segments 24, the solenoid 54 will be intermittently energized ten times to bring about the rocking movement of the commutator 23. This rocking movement of the commutator is utilized, in the present invention, to bring about the desired substantially instantaneous movement of the contact element 19 from each engaged segment 24 to the next adjacent segment 24 just as the element moves toward disengagement from the engaged segment.

This can best be illustrated by reference to Figure 2 in which the segments 24 are shown linearly arranged and the segment 51 shown in planar form. Let it be assumed that the contact element 19 has just been moved by the shaft 15 into engagement with the contact segment 24 indicative of the zero position and labeled "0" in the figure referred to above. The elongate segment 51 is so arranged about the cylindrical wall surface 48 that in this relative position of the contact element 19 and "0" segment, the contact 46 is out of engagement with segment 51 and the coil 53 of the solenoid 54 deenergized and the armature plate 55 held by spring 60 in its normal position.

As the shaft 15 continues to rotate, it will be seen that the contact 19 will move in the direction of the arrow 61 across the segment labeled "0." Revolution of the shaft 15 through the gear train described will conjointly drive the shaft 42 so that the contact element 46 will, at the same time, be moving toward engagement with the segment 51. The moment the contact 46 moves into engagement with the one end of the segment 51, the coil 53 of the solenoid 54 is energized to bring about the before described rocking movement of the commutator 23 in a clockwise direction, as viewed in Figure 1. This movement of the commutator 23 produces counterclockwise movement of the contact element 19 relative to the segment 24, as viewed in Figure 1, or the left as viewed in Figure 2, and this relative movement of the contact and the segment labeled "0" is indicated by the arrow 62.

As the shaft 15 continues to rotate, the contact will again move longitudinally of the segment 24 labeled "0" in the direction of the arrow 63. At the same time, the contact element 46 is now moving along the elongate segment 51 and the coil 53 of the solenoid 54 remains energized. As the contact element 46 moves out of engagement with the segment 51, the coil 53 of the solenoid 54 is deenergized and the return spring 60 rocks the armature plate 55 and consequently the commutator 23 in a counterclockwise direction, as viewed in Figure 1, to its normal position which, as should now be understood, moves the contact element 19 in the direction of the arrow 64 of Figure 2 and into engagement with the segment 24 labeled "1." The return movement of the armature plate 55, upon deenergization of the coil 53, is substantially instantaneous so that just as the contact element 19 is moving toward disengagement from the segment 24 labeled "0," it is very quickly swept into engagement with the segment 24 labeled "1."

This cycle of operation is, of course, repeated for each revolution of the shaft 42 and it is not believed necessary to again explain the relative movement of the contact element 19 and the other segments 24 as the element seriately moves over the same as the shaft 15 is rotatably driven.

It will be seen, however, that the contact element 46, as it intermittently engages the elongate segment 51 of the commutator 49, produces, through intermittent energization of the solenoid 54, the necessary intermittent rocking of the commutator 23 to prevent the contact element 19 from coming to rest between adjacent pairs of segments 24. By supplying the commutator 23 with an elongate segment 65 extending substantially 180 degrees about the wall surface 22, also engaged by the contact element 19 as the shaft 15 is rotated, the commutator 23 can be used to create the necessary intermittent rocking movement of a commutator 66, similar to commutator 23, and adapted to positively indicate complete revolutions of the shaft 15.

In the now preferred embodiment of the present invention, this is brought about by rotatably driving a shaft 67 journaled in suitable bearings 68 carried by the wall elements 11 and 12 at one-tenth the speed of the shaft 15. Any suitable gear train can be used to bring about the desired speed ratios of the two shafts but in the form herein shown, the gear train comprises a pinion 69 fixed to the shaft 15 and engaging and driving a gear 71 coaxially carried by a shaft 72, the opposite ends of which are journaled in bearings 73 also carried by the wall elements 11 and 12. A pinion 74, coaxially mounted to the shaft 72, engages and drives a gear 75 fixed to the shaft 67. The gear train formed by the gear elements just described is such that for each complete revolution of the shaft 15, the shaft 67 will be driven a tenth of a revolution.

Slidably mounted to the inner end of the shaft 67 is a contact element 76, identical in all respects to contact element 19, seriately engageable with ten circumferentially spaced segments 77 embedded in the material of the cylindrical wall of the commutator 66. The segments 77 include terminal members 78 electrically connected by suitable conductors, not shown, to a second bank of linearly arranged lamps identical to the lamps 27 but mounted adjacent digit bearing, translucent discs 79 closing aligned openings formed in the front face of the panel board 28 and extending substantially parallel to the openings closed by the discs 33.

Here again the lamps are intermittently energized as the contact element 76 seriately moves over the segments 77 upon rotation of the shaft 67 and the lamps, as the same are energized, will indicate the position of the contact element 76 relative to the segments 77.

The contact element 19 and the elongate segment 65 of the commutator 23 perform exactly the same function with respect to solenoid 81 as did the contact element 46 and the elongate segment 51 of the commutator 49 with respect to solenoid 54. This function will be more clearly understood by referring to Figure 5 for it will be seen that the contact element 19 and the elongate segment 65 will intermittently energize the coil of a solenoid 81, identical to solenoid 54, as the contact element 19 is moved in its circular path conjointly with rotation of the shaft 15. It should be understood now, as the contact element 19 moves into engagement with the elongate segment 65, that a circuit from the source indicated at 82 is completed through the coil of the solenoid 81, conductor 83, elongate segment 65, and thence to ground 32 by means of the contact element 19 and its arm 18. Thus, at each engagement of the contact element 19 with the elongate segment 65, the armature plate 84 of the solenoid 81 will be arcuately moved as was the armature plate 55 of the solenoid 54. The armature plate 84 concentrically carries a stub shaft 85, to the outer end of which is fixed a bushing 86 coaxially carried by the circular wall 87 closing the one end of the commutator 66. The stub shaft 85 supports the commutator 66 in a position in which the inner cylindrical wall surface thereof is concentric with the axis of rotation of the shaft 67.

It is not believed necessary to again explain in detail the cycle of operation of the commutator 66 but suffice it to say, the contact element 76 thereof will move in exactly the same path of motion over the contact segments 77 as does the contact element 19 over the contact segments 24 of the commutator 23.

As the shaft 67 is rotatably driven at one-tenth the speed of the shaft 15, it will be understood that the shaft 67 will be driven one-tenth of a revolution for each complete revolution of the shaft 15 and the position of the contact segment 76 relative to the segment 77 will actually indicate the number of complete revolutions of the shaft 15. Thus, although the lamps are seriately energized at the completion of each tenth of a revolution of the shaft 67, these lamps indicate, when energized, complete revolutions of the shaft 15. For example, if the contact element 76 is engaging the first segment beyond the segment indicative of the "0" position of the shaft 67, that is, the shaft has been driven a tenth of a revolution, the lamp to the rear of the disc 79 bearing the digit "1" will be energized to indicate that the shaft 15 has been rotated one complete revolution.

It should be obvious now that by merely duplicating elements and by rotating a shaft at one-tenth the speed of the shaft 67, it is possible to provide a device which will indicate revolutions of the shaft 15 of a larger number than is possible with but the commutators 23 and 66. Thus, in the embodiment of the invention herein illustrated, a third commutator 91, identical to commutators 66 and 23, is used to control the energization of a third bank of linearly arranged lamps on the panel board 28. These lamps, not shown, illuminate translucent discs 92 closing openings aligned with the lamps, which discs again bear indicia in the form of the digits.

The commutator 91 is intermittently rocked by a solenoid 93, identical to the solenoid 81, to bring about the same relative movement of the contact element 94 and the circumferentially spaced segments 95 of the commutator 91 as is had between the contact element 76 and the segments 77. The contact element 94, like the contact element 76, is carried at the inner end of a shaft 96 journaled in bearings 97 carried by the wall elements 11 and 12 of the casing 10. The shaft 96, through a gear train 98, identical to the gear train formed by the gear elements 69, 71, 74, and 75, is driven at one-tenth the speed of the shaft 67 so that the contact element 94 is seriately moved over the ten segments 95 during each revolution of the shaft 96.

The contact element 76 is used to control the intermittent energization of the coil of the solenoid 93 in exactly the same manner as contact element 19 controls energization of the solenoid 81. Thus, as the contact element 76 intermittently engages the elongate segment 99, which extends substantially 180 degrees about the inner cylindrical wall surface of the commutator 66, the solenoid 93 will, through its armature plate 100, rock the shaft 101 to produce the same arcuate movement in the commutator 91. The relative movement of the contact element 94 and the segments 95 is, therefore, identical to the movement of the previously described contact elements 76 and 19 of commutators 66 and 23 respectively.

As the shaft 96 is rotated at one-tenth the speed of the shaft 67, which in turn is rotatably driven at one-tenth the speed of the shaft 15, it will be obvious that for ten revolutions of the shaft 15, the shaft 67 will make one complete revolution and shaft 96 will move through one-tenth of a complete revolution. Thus, energization of the lamps aligned with the disc 33 will indicate, in tenths, revolutions of the shaft 15 while the lamps aligned with the disc 79 will indicate complete revolutions of the shaft 15. On the other hand, energization of the lamps aligned with the disc 92 will indicate revolutions of the shaft 15 in multiples of ten. For example, if the disc bearing the digit "3" of the third bank of discs was illuminated by its lamp and the discs bearing the digits "0" were illuminated in the other two banks of discs, this signal would indicate that the shaft 15 had been rotatably driven thirty times.

The embodiment of the device herein shown will thus read in tenths up to and including one hundred revolutions of the shaft 15. It is obvious that if revolutions of the shaft 15 in excess of one hundred were desired to be counted, it would merely be necessary to add another solenoid and its associated elements together with a gear train for driving a fourth shaft at one-tenth the speed of rotation of the shaft 96.

It might be well to point out here that each commutator forms a means for insuring a positive carry-over at each decade change. Thus, for example, as contact element 19 is moving toward disengagement from the "9th" segment 24 indicative of nine-tenths of a revolution of shaft 15, and is about to be quickly swept onto the next adjacent segment indicative of one complete revolution of the shaft, the coil of the solenoid 81 will at this time be energized through engagement of the contact element 19 with the elongate segment 65. At the same time the coil of the solenoid 54 is also energized, as should now be understood, and the moment the contact element 46 moves out of engagement with the elongate segment 51, resulting in de-energization of the coil of the solenoid 54, the contact element 19 will be substantially instantaneously moved into engagement with the segment 24 indicative of one complete revolution of the shaft 15.

As contact element 46 moves out of engagement with the elongate segment 51, contact element 19 simultaneously moves out of engagement with the elongate segment 65, resulting in de-energization of the coil of the solenoid 81 to bring about substantially instantaneous movement of the contact element 76 from its position engaging the segment indicative of zero revolutions of the shaft 67 to one next adjacent segment indicative of one-tenth of a revolution of the shaft 67 which, as will be remembered, indicates one complete revolution of the shaft 15. Movement of the contact element 76 into engagement with the segment 77 indicative of one-tenth of a revolution of the shaft 67 will, of course, result in energization of the lamp associated with the disc 79 bearing the digit "1." Thus, at this time, the dial formed by the lamps and their associated discs will indicate that the shaft 15 has been rotated one complete revolution.

This identical carry-over will occur at each decade change for it should be obvious now that commutator 66, through its contact element 76 and elongate segment 99 will, in effect, trip the commutator 91 just as the contact element 76 moves into engagement with the segment 77 indicative of one complete revolution of the shaft 67. Thus, at each decade change the de-energization of the solenoid coils conditions the commutators for registering units in the next succeeding decade.

It will now be seen that each group of segments together with the contact element associated therewith forms a summator means for actually counting and summating partial, as well as complete, revolutions of the shaft 16.

Although the device herein illustrated has been described as one for registering or indicating decaded revolutions of the shaft 15, it should be obvious that the device is not limited to a decimal system for obviously the segments of the commutators could be other than ten in number.

The device of the present invention may be used to re-set the shaft 15 to a preselected position indicative of a predetermined value by rotating the shaft 42 which, as should be understood, will drive the shaft 15 through the gear train formed by the gear elements 34, 35, 39, and 41. The shaft 42 could be rotatably driven by any means desired, such as a small handwheel indicated at 104. In this use of the instrument, the handwheel 104 would be used to rotatably drive the shaft 15 a predetermined number of revolutions, as indicated by the scale or counter formed by the lamps and their associated discs.

Although the impulses created by the engagement between the contact elements 19, 76, and 94 with their respective circumferentially spaced segments have been shown herein as delivered to the lamps, it should be obvious now that these impulses representing complete as well as partial revolutions of the shaft 15 could be fed into any electro-responsive device which in its cycle of operation requires an input of positive signals in discrete discontinuous form. The invention is, therefore, not limited merely to a device which counts revolutions of a rotating member such as the shaft 16 and furnishes a positive value in digital form.

Although the shaft 15 could be driven at such a rate of speed that the response of the lamps 27 or other signal receiving devices, electrically connected to the terminals 25 of the segments 24, would actually lag behind movement of the contact element 19 because of delay in the operation of elements such as the solenoids, this creates no error in the final reading for regardless of the speed of rotation of the shaft 15, the mechanism is capable of producing upon cessation of rotation of the shaft 15 a correct signal or indication in digital form of the total number of revolutions of the shaft.

Although the now preferred embodiment of the present invention has been shown and described herein, it is to be understood that the invention is not to be limited thereto, for it is susceptible to changes in form and detail within the scope of the appended claims.

We claim:

1. A device of the type described, comprising: a member adapted to be moved at a rate proportional to the rate of movement of a movable part, the varying value of the movement of which is to be registered; a succession of at least two groups of normally open circuits, each group having the same given number of circuits; a circuit closing element operatively associated with each group of circuits; means for cyclically moving one of said elements at a preselected rate of movement proportional to the rate of movement of said member as said member is moved to thereby successively close the circuits of one group as said member is moved a predetermined quantum of movement whereby the varying value of the progression of said member less than said quantum is registered in discrete form; means for moving the other of said elements at a preselected rate less than but proportional to the rate of movement of said first element whereby the circuits of said second group are successively and intermittently closed as said member is moved multiples of said quantum whereby the varying value of the progression of said member in excess of said quantum is registered in discrete form; and means including an electro-responsive means associated with said second group and having an energizing member operatively associated with said first element and engaged thereby for substantially instantaneously moving said second element to sequentially close the circuits of said second group at the completion of each cycle of movement of said first element in response to movement of said member said quantum of movement.

2. A device of the type described, comprising: a rotatable member adapted to be rotatably driven from a moving part, the movement of which is to be registered; a succession of at least two groups of contact segments, the segments of each group being equal in number to the segments of the other group and being circularly arranged in an equally spaced apart relationship; electro-responsive means electrically connected to each segment; a contact element movable into engagement with the segments of each group to energize the means connected to each segment; means for connecting the first contact element to said member for rotational movement therewith, whereby said contact element seriately moves into engagement with the segments of the first group thereby seriately energizing the means connected to the segments of said group, the seriate energization of said means measuring the progression of said contact element relative to said segments, to thereby register partial revolutions of said member; means for rotatably driving the second contact element at a preselected fractional rate of the movement of said member, the denominator of said rate being equal to the number of segments of each group, whereby said second contact element is seriately moved into engagement with the segments of the second group as said member is rotatably driven a predetermined number of complete revolutions equal to the denominator of said fractional rate; the seriate energization of the electro-responsive means connected to the segments of the second group measuring the progression of said second contact element to thereby register in units complete revolutions of said member equal in number to said denominator; and an electro-responsive means, including means engaged by said first contact element to render the same operative by completion of each measurement cycle of said first contact element, for substantially instantaneously relatively moving said second contact element from a segment engaged thereby to the next adjacent segment.

3. A device of the type described, comprising: at least two groups of spaced apart contact segments; a contact element seriately movable into engagement with the segments of each group; a rotatable member adapted to be rotatably driven from a moving member, the varying value of the movement of which is to be registered; means for connecting one of said contact elements to said member for rotational movement therewith, whereby said contact element is seriately moved into engagement with the segments of the one group for each complete revolution of said member; means including an electro-responsive device operatively connected to said one group of segments; means rotatably driven at a rate in excess of the rate of movement of said member equal to the number of segments of said one group for energizing said electro-responsive device for producing substantially instantaneous relative movement between said one group of segments and the contact element engageable therewith intermittently and proportional to the number of said segments, whereby said first element is relatively moved substantially instantaneously from an engaged segment into engagement with the next adjacent segment, thereby to eliminate time lag in the transit of the contact element from one segment to the next adjacent segment; means for rotatably driving the second contact element at a preselected fractional rate of the movement of said member, the denominator of which is equal to the number of segments in each group; whereby said last mentioned contact element is seriately moved into engagement with the segments of the second group as said member is rotatably driven a predetermined number of complete revolutions equal to the denominator of said fractional rate; and means, including a second electro-responsive device associated with said second group and electrically connected to a contact means associated with said first group and adapted to be engaged by said first contact element for producing substantially instantaneous relative movement between said second group of segments and the contact element engageable therewith intermittently and proportional to the number of the segments of the second group, whereby said second contact element is relatively moved substantially instantaneously from an engaged segment into engagement with the next adjacent segment thereby to eliminate time lag in the transit of the second contact element from one segment of the second group to the next adjacent segment of the group.

4. A device of the type described, comprising: a rotatable member adapted to be rotatably driven from a moving part, the movement of which is to be registered; a succession of at least two groups of contact segments, the segments of each group being equal in number to the segments of the other group and being circularly arranged in an equally spaced apart relationship; electro-responsive means electrically connected to each segment; a contact element movable into engagement with the segments of each group to energize the means connected to each segment; means for connecting the first contact element to said member for rotational movement therewith, whereby said contact element seriately moves into engagement with the segments of the first group thereby seriately energizing the means connected to the segments of said group, the seriate energization of said means measuring the progression of said contact element relative to said segments to thereby register partial revolutions of said member; means including an electro-responsive device operatively connected to said one group of segments; means rotatably driven at a rate in excess of the rate of movement of said member equal to the number of segments of said one group for energizing said electro-responsive device for producing substantially instantaneously relative movement between said segments and said first contact element, intermittently and proportional, to the number of said segments whereby said first contact element is relatively moved substantially instantaneously from an engaged segment into engagement with the next adjacent segment, thereby to eliminate time lag in the transit of the contact element from one segment to the next adjacent segment; means for rotatably driving the second contact element at a preselected fractional rate of the movement of said member, the denominator of said rate being equal to the number of segments of each group whereby said second contact element is seriately moved into engagement with the segments of the second group as said member is rotatably driven a predetermined number of complete revolutions equal to the denominator of said fractional rate; the seriate energization of the electro-responsive means connected to the segments of the second group measuring the progression of said second contact element relative to the segments of the second group to thereby register, in units, complete revolutions of said member equal in number to said denominator; and means including an electro-responsive device operatively connected to said second group of segments and the contact element movable thereover; means for energizing said device including means engaged by said first contact element at the completion of each measurement cycle of said first contact element for relatively moving substantially instantaneously said second contact element from a segment engaged thereby to the next adjacent segment.

5. A device of the type described, comprising: a rotatable member adapted to be rotatably driven from a moving part, the movement of which is to be registered; a succession of at least two groups of contact segments, the segments of each group being equal in number to the segments of the other group and being circularly arranged in an equally spaced apart relationship; each segment forming a part of a normally open circuit; a contact element forming a circuit closing means movable into engagement with the segments of each group to close the circuit of which each segment forms a part; means for connecting the first contact element to said member for rotational movement therewith, whereby said contact element seriately moves into engagement with the segments of the first group thereby seriately energizing the said circuits, the seriate energization of said circuits measuring the progression of said contact element relative to said segments, thereby registering partial revolutions of said member; means for rotatably driving the second contact element at a preselected fractional rate of the movement of said member, the denominator of said rate being equal to the number of segments of each group, whereby said second contact element is seriately moved into engagement with the segments of the second group as said member is rotatably driven a predetermined number of complete revolutions equal to the denominator of said fractional rate; the seriate energization of the circuits of which the segments of the second group form a part measuring the progression of said second contact element relative to the segments of the second group to thereby register, in units, complete revolutions of said member equal in number to said denominator; and electro-responsive means for producing substantially instantaneously relative movement between said second group of segments and the contact element engageable thereover sufficient to relatively move said contact element from one segment to the next adjacent segment; said electro-responsive means including a contact member associated with said first group of segments and engaged by said first contact element for energizing said electro-responsive means as said first contact element completes each cycle thereof to register a complete revolution of said member.

6. A device of the type described, comprising: a rotatable member adapted to be rotatably driven from a movable part, the varying value of the movement of which is to be registered; a succession of at least two groups of contact segments, the segments of each group being equal in number to the segments of the other group and being circularly arranged in an equally spaced apart relationship; electro-responsive means electrically connected to each segment; a contact element movable into engagement with the segments of each group to energize the means connected to each segment; means for connecting the first contact element to said member for rotational movement therewith, whereby said contact element seriately moves into engagement with the segments of the first group thereby seriately energizing the means connected to the segments of said group, the seriate energization of said means measuring the progression of said contact element relative to said segments, thereby registering partial revolutions of said member; means for rotatably driving the second contact element at a preselected fractional rate of the movement of said member, the denominator of said rate being equal to the number of segments of each group, whereby said second contact element is seriately moved into engagement with the segments of the second group as said member is rotatably driven a predetermined number of complete revolutions equal to the denominator of said fractional rate; the seriate energization of the electro-responsive means connected to the segments of the second group measuring the progression of said second contact element to thereby register, in units, complete revolutions of said member equal in number to said denominator; an electro-responsive device operatively connected to said second group of segments for producing substantially instantaneously relative movement between said second group of segments and the contact element engageable thereover sufficient to relatively move said second contact element from one segment to the next adjacent segment; and means including an elongate contact member associated with said first group of segments and intermittently engaged by said first contact element for energizing said electro-responsive device at the completion of each measurement cycle of said first contact element.

7. A device of the type described, comprising: a rotatable member adapted to be rotatably driven from a movable part, the varying value of the movement of which is to be registered; a succession of at least two groups of contact segments, the segments of each group being equal in number to the segments of the other group; a first contact element adapted to be seriately engaged with the segments of the first group; means for producing relative movement of said contact element and segments in accordance with rotational movement of said member, said contact element relatively traversing said segments to complete a measurement cycle at each complete revolution of said member; electro-responsive means connected to each segment of said first group and seriately energized as said contact element successively moves into engagement with said segments for indicating the position of said contact element relative to said segments, thereby to register in discrete form partial revolutions of said member indicative of the quantum of said varying value; means including an electro-responsive device operatively connected to said one group of segments; means rotatably driven at a rate in excess of the rate of movement of said member equal to the number of segments of said one group for energizing said electro-responsive device for producing substantially instantaneous relative movement between said segments and said contact element intermittently and proportional to the number of said segments whereby said contact element is relatively moved substantially instantaneously from an engaged segment into engagement with the next adjacent segment; a second contact element engageable with the segments of said second group; means for moving said second contact element relative to the segments of the second group at a preselected fraction of the rate of movement of said first contact element relative to the segments of the first group, the denominator of said fraction being equal to the number of segments of each group, whereby said second contact element relatively traverses the segments of the second group as said first contact member completes measurement cycles of a number equal to said denominator; electro-responsive means connected to each segment of said second group and successively energized as said second contact element relatively traverses said segments to thereby register complete revolutions of said member; and means including an electro-responsive device operatively connected to said second group of segments and the contact element movable thereover; means for energizing said device including means engaged by said first contact element at the completion of each measurement cycle of said first contact element energization of said device substantially instantaneously moving said second contact element from a segment engaged thereby to the next adjacent segment of the group.

8. A device of the type described, comprising: a member adapted to be moved at a rate proportional to the rate of movement of a movable part, the varying value of the movement of which is to be registered; a succession of at least two groups of contact segments, the segments of each group being equal in number to the segments of the other group; electro-responsive means electrically connected to each segment; a contact element engageable with the segments of each group; means for connecting the contact element engageable with the segments of the first group to said member for movement therewith, whereby said contact element is successively moved into engagement with the segments of the first group for a predetermined quantum of movement of said member, thereby seriately energizing the means connected to the segments of said group, the seriate energization of said means measuring the progression of said contact element relative to said segments to thereby register discrete partial revolutions of said member; means for moving the second contact element at a preselected fractional rate of the movement of said member, the denominator of said rate being equal to the number of segments of each group, whereby said second contact element is seriately moved into engagement with the segments of the second group as said member is moved multiples of said predetermined quantum equal in number to the denominator of said fractional rate; the seriate energization of the electro-responsive means connected to the segments of the second group measuring the progression of said second contact element to thereby register integer revolutions of said member equal in number to said denominator; an electro-responsive device, operable when energized, to produce substantially instantaneously relative movement between said second group of segments and the contact element engageable thereover sufficient to relatively move said contact element from one segment to the next adjacent segment; and means associated with said first group of segments and engaged by said first contact element at the completion of each measurement cycle of said first contact element for energizing said last named device.

9. A device of the type described, comprising: a succession of groups of spaced apart contact segments; a movable contact element movable into engagement with the segments of each group; a rotatable member adapted to be rotatably driven from a movable member, the varying value of the movement of which is to be registered; means for moving said contact elements in accordance with movement of said member in cycles at individual rates differing by multiples of said given number whereby each contact element is successively moved into engagement with the segments of the group with which it is associated, said contact elements thereby forming with the succession of groups of segments counters for counting in successive order according to the rate of movement thereof revolutions of said member; an electro-responsive device operatively connected to each group of contact segments operable, when energized, to accelerate the rate of movement of each contact element relative to the group of segments engaged thereby; and means operatively associated with each contact element and engaged by the same as it completes each counting cycle thereof for energizing the device connected to the group of contact segments forming a part of the counter of the next highest order thereby accelerating the rate of relative movement of the counter of the next higher order and the segments engaged thereby to minimize the time lag in the transit of the contact element of the next higher order counter from one segment to the next adjacent segment.

10. A device of the type described, comprising: a succession of groups of spaced apart contact segments; a movable contact element movable into engagement with the segments of each group; a rotatable member adapted to be rotatably driven from a movable member, the varying value of the movement of which is to be registered; means for moving said contact elements in accordance with movement of said member in cycles at individual rates differing by multiples of said given number whereby each contact element is successively moved into engagement with the segments of the group with which it is associated, said contact elements thereby forming counters for counting in successive order according to the rate of movement thereof revolutions of said member; an electro-responsive device connected to each counter operable, when energized, to substantially instantaneously move the contact element thereof relative to the segments thereof a distance substantially equal to the distance between adjacent segments; and elongate contact means associated with each group of segments and engaged by the contact element movable thereover as the element completes each cycle of movement relative to the segments; and circuit means interconnecting each contact means and the electro-responsive device of the next highest order counter, whereby engagement of a contact element with the contact means of a counter energizes the electro-responsive device of the next highest order counter to relatively move the contact element thereof substantially instantaneously from an engaged segment into engagement with the next adjacent segment.

11. A device of the type described, comprising: a member adapted to be moved at a rate proportional to the rate of movement of a movable part, the varying value of the movement of which is to be registered; first electro-responsive means, including means moved in accordance with movement of said member, for counting and summating preselected aliquot portions of a predetermined quantum of movement of said member; means operatively associated with said electro-responsive means for registering the movement of said member at the completion of each aliquot portion of said quantum of movement, whereby the movement of said part less than said quantum is registered in discontinuous discrete form; second electro-responsive means, including means moved at a fraction of the rate of movement of said first moving means, for counting and summating movement of said member in integers of said quantum; means operatively associated with said second electro-responsive means for registering the movement of said member at the completion of each quantum of movement, whereby the movement of said part in integers of said quantum is registered in discontinuous discrete form; and means including an electro-responsive device rendered operative by movement of said movable means at each summation of said first electro-responsive means of movement of said member each predetermined quantum of movement for substantially instantaneously rendering said second electro-responsive means operative to count completion of movement of said part equal to said quantum, to thereby substantially instantaneously render said second registering means operative to register completion of each integer of said quantum of movement.

12. In a device of the type described: a bank of electro-responsive counters, each having a movable element and the same given number of spaced circuit closing segments traversed by an element; a member adapted to be moved at a rate proportional to the rate of movement of a movable part, the varying value of the movement of which is to be registered; means operatively connected to said member for moving said elements, whereby said elements traverse their circuit closing segments in cycles at individual rates of movement differing by multiples of said given number; electro-responsive means electrically connected to each segment and adapted, when energized, to indicate in successive orders differing by multiples of said given number the progression of the movable member; and means, including means mechanically connected to each counter and electrically connected to means operatively associated with the next lower order counter and engaged by the movable element thereof, adapted to substantially instantaneously move the movable element of the counter of the next highest order at the completion of the operating cycle of the counter of the next lower order, whereby the next higher order counter initiates a new operating cycle at the completion of the operating cycle of the next lower order counter.

13. A device of the type described, comprising: a rotatable shaft; means for driving said shaft from a moving member, the movement of which is to be registered; support means presenting an inner cylindrical wall surface concentrically circumscribing said shaft; a plurality of equally spaced apart contact segments carried by said wall surface; a contact element carried by said shaft and seriately movable into engagement with said segments as said shaft is rotatably driven; circuit means electrically connected to each segment and seriately energized to indicate the position of said element relative to said segments thereby indicating in discontinuous discrete form partial revolutions of said shaft as the same is rotatably driven; a second shaft; means for rotatably driving said second shaft from said first shaft at a fraction of the rate of movement of said first shaft, the denominator of which is equal in number to the number of said segments; second support means presenting an inner cylindrical wall surface concentrically circumscribing said second shaft; a plurality of equally spaced apart contact segments carried by said last named wall surface; a second contact element carried by said second shaft and seriately movable into engagement with said last named segments as said second shaft is rotatably driven; circuit means electrically connected to each of said last named segments and seriately energized to indicate the position of said second contact element relative to said last named segments as said second shaft is rotatably driven to thereby indicate partial revolutions of said second shaft and complete revolutions of said first shaft; a solenoid; means operatively connected to said solenoid and arcuately moved upon energization of said solenoid; means connected said last named means to said second support means for arcuate movement therewith a distance substantially equal to the distance between the segments carried by the inner wall surface of said second support means; means for energizing said solenoid including, a contact carried by said first support means and engaged by the contact element carried by said first shaft at each complete revolution of said first shaft, whereby said solenoid is energized to produce substantially instantaneous arcuate movement of said second support means at each complete revolution of said first shaft to eliminate time lag in the transit of said second contact element from one segment to the next adjacent segment of the second group.

14. A device of the type described, comprising: a member adapted to be moved at a preselected rate of movement proportional to the rate of movement of a movable part, the varying value of the movement of which is to be registered; first electro-responsive means, including a first movable means moved in accordance with movement of said member and completing a preselected cycle of movement for each predetermined quantum of movement of said member, for counting preselected fractional portions of said predetermined quantum of movement of said member; means operatively associated with said electro-responsive means for registering the movement of said movable means as the same is successively moved fractional portions of its cycle of movement equal to said preselected fractional portions of said quantum of movement, whereby the varying value of the movement of said part less than said quantum is discretely registered; second electro-responsive means, including a second movable means moved at a fraction of the rate of movement of said first movable means and completing a preselected cycle of movement as said first movable means completes a predetermined plurality of cycles, for counting movement of said member in integers of said quantum; means operatively associated with said second electro-responsive means for registering the movement of said second movable means as the same is successively moved fractions of its cycle equal to the fraction of its rate of movement relative to said first movable means, whereby the movement of said part in integers of said quantum is registered in discontinuous discrete form; and means, including an electro-responsive device operatively connected to said second movable means and means for energizing said device including means engaged by said first movable means, for substantially instantaneously moving said second movable means said fractional part of its cycle of movement to thereby render said second registering means operable to instantaneously register integers of said quantum.

15. A device of the type described, comprising: a member adapted to be moved at a rate proportional to the rate of movement of a movable part, the varying value of the movement of which is to be registered; a succession of at least two groups of normally open circuits; a circuit closing element operatively associated with each group of circuits; means for cyclically moving one of said elements at a preselected rate of movement proportional to the rate of movement of said member as said member is moved to thereby successively close the circuits of one group as said member is moved a predetermined quantum of movement whereby the varying value of the progression of said member less than said quantum is registered in discrete form; means for moving the other of said elements at a preselected rate less than but proportional to the rate of movement of said first element whereby the circuits of said second group are successively and intermittently closed as said member is moved multiples of said quantum whereby the varying value of the progression of said member in excess of said quantum is registered in discrete form; and means, including an electro-responsive means associated with said second group and means associated with said first element sensing completion of each cycle of movement of said first element, for substantially instantaneously moving said second element to sequentially close the circuits of said second group at the completion of each cycle of movement of said first element in response to movement of said member said quantum of movement.

BERNARD S. BENSON.
RALPH E. BROWN.

REFERENCES CITED

The following references are of record in the file of this patent:

UNITED STATES PATENTS

| Number | Name | Date |
|---|---|---|
| 2,180,908 | Nevinger | Nov. 21, 1939 |
| 2,258,204 | Gould | Oct. 7, 1941 |
| 2,416,081 | Bakke | Feb. 18, 1947 |
| 2,436,235 | Sunstein | Feb. 17, 1948 |
| 2,496,585 | Harper | Feb. 7, 1950 |